(12) United States Patent
Cuddihy et al.

(10) Patent No.: US 11,350,236 B2
(45) Date of Patent: May 31, 2022

(54) SYSTEMS AND METHODS FOR OBTAINING A RIDE IN A RIDE-HAIL VEHICLE

(71) Applicant: Ford Global Technologies, LLC, Dearborn, MI (US)

(72) Inventors: Mark Cuddihy, New Boston, MI (US); Kwaku Prakah-Asante, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/071,151

(22) Filed: Oct. 15, 2020

(65) Prior Publication Data
US 2022/0124450 A1    Apr. 21, 2022

(51) Int. Cl.
*H04W 4/021*  (2018.01)
*G06Q 50/30*  (2012.01)
*H04W 4/44*   (2018.01)

(52) U.S. Cl.
CPC ............ *H04W 4/021* (2013.01); *G06Q 50/30* (2013.01); *H04W 4/44* (2018.02)

(58) Field of Classification Search
CPC ......... H04W 4/021; H04W 4/44; G06Q 50/30
USPC ...................................................... 455/456.3
See application file for complete search history.

(56) References Cited

U.S. PATENT DOCUMENTS

| 9,813,878 | B1 | 11/2017 | Buttolo et al. |
| 9,928,745 | B2 | 3/2018 | Backof, II et al. |
| 2016/0057574 | A1* | 2/2016 | Park ...................... H04W 4/021 455/456.2 |
| 2017/0339529 | A1* | 11/2017 | Buttolo .................. H04L 67/22 |
| 2018/0039917 | A1 | 2/2018 | Buttolo et al. |
| 2018/0218470 | A1* | 8/2018 | Belwafa ................. G06Q 50/30 |
| 2018/0322775 | A1* | 11/2018 | Chase ................. G01C 21/3438 |
| 2019/0265868 | A1* | 8/2019 | Penilla ................... G07C 5/008 |
| 2020/0027291 | A1* | 1/2020 | Mizuno ................. G06Q 50/30 |
| 2020/0160477 | A1* | 5/2020 | Ramot ................... B60L 53/66 |
| 2020/0160705 | A1* | 5/2020 | Chase .................... G06Q 50/30 |

(Continued)

OTHER PUBLICATIONS

Kumaresan et al., "Beacon Based Vehicle Tracking and Vehicle Monitoring System", International Journal of Advanced Research in Computer and Communication Engineering, vol. 5, Issue 3, Mar. 2016, 5 pages.

*Primary Examiner* — Hirdepal Singh
(74) *Attorney, Agent, or Firm* — Brandon Hicks; Eversheds Sutherland (US) LLP

(57) ABSTRACT

The disclosure pertains to minimizing delay when a customer seeks a ride in a ride-hail vehicle at a crowded venue where multiple customers are attempting to obtain rides in ride-hail vehicles. In an example procedure, a ride-hail service provider responds to a ride request originated from a personal device of the customer by providing a ride-ID code or some other form of ride-confirmation data. The customer enters any ride-hail vehicle at the crowded venue without interacting with the driver of the vehicle prior to getting into the vehicle. The personal device of the customer then uses communications such as Bluetooth® to execute a triangulation procedure for determining whether the personal device is inside the vehicle. Upon confirming that the personal device is inside the vehicle, the ride-ID code is automatically transmitted to a personal device of the driver and further communications may then be carried out for authenticating the ride.

20 Claims, 7 Drawing Sheets

(56) References Cited

U.S. PATENT DOCUMENTS

2020/0327472 A1* 10/2020 Anderson ........ G06Q 10/06314
2020/0349666 A1* 11/2020 Hodge .................... G06F 21/36
2020/0359216 A1* 11/2020 Akpinar ................. H04L 67/12

* cited by examiner

SYSTEMS AND METHODS FOR OBTAINING A RIDE IN A RIDE-HAIL VEHICLE

BACKGROUND

The use of ride-hail vehicles has proliferated over the past few years due to various reasons. A primary reason for the popularity of ride-hail services lies in the fact that a person seeking a ride to a destination can conveniently summon a ride-hail vehicle by using a software application in a smartphone and not have to deal with hassles such as driving a personal vehicle or paying high rates for a taxi or rental car.

In some cases, a wait time for a ride-hail vehicle may be unacceptably long, such as after a concert or sporting event. Even when a ride-hail customer has received a confirmation for a ride in a particular ride-hail vehicle, the driver of the ride-hail vehicle may have difficulty in reaching a pickup spot (due to various reasons, such as traffic congestion) and/or in making an accurate identification of the customer. Accurate identification of the customer, by the driver, and conversely, accurate identification of the vehicle, by the customer, can be a time-consuming and frustrating process in some cases.

Accordingly, it would be advantageous to eliminate, or at least minimize, time delays associated with at least some rendezvousing and authentication operations. Rendezvousing and authenticating operations are typically executed prior to the customer getting into the ride-hail vehicle, via communications between the driver, the customer, and the ride-hail service provider. It would be particularly desirable to eliminate time delays associated with such operations.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
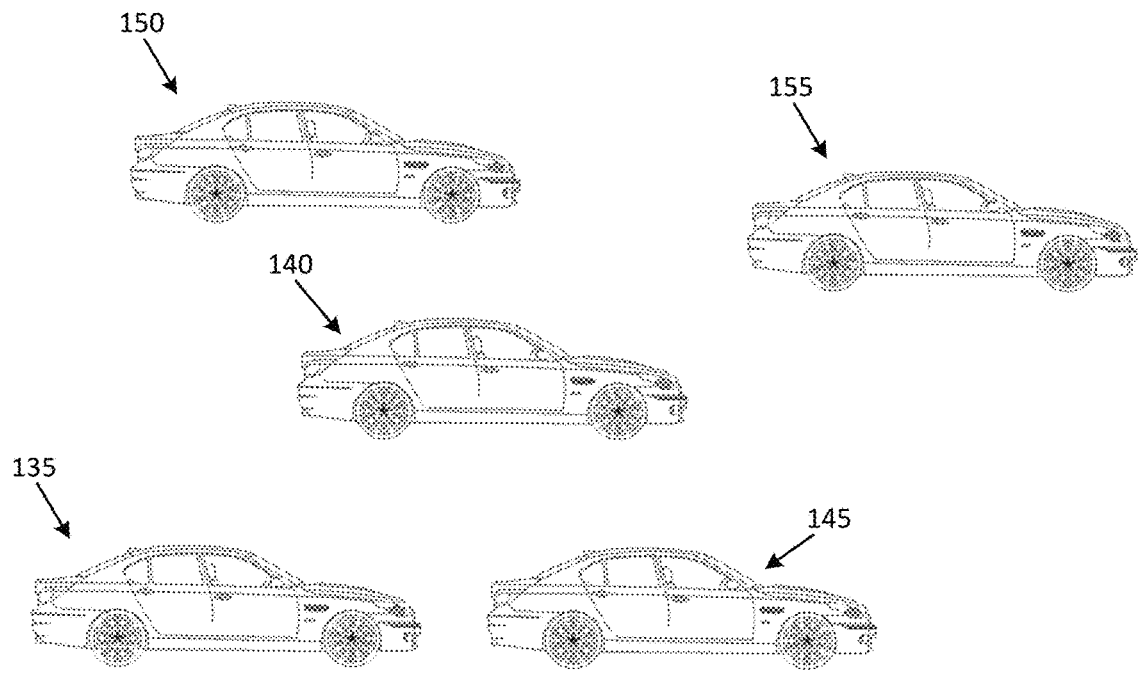
FIG. 1 illustrates a first example scenario where several customers are seeking the services of ride-hail vehicles at a crowded venue.
Figure 1:
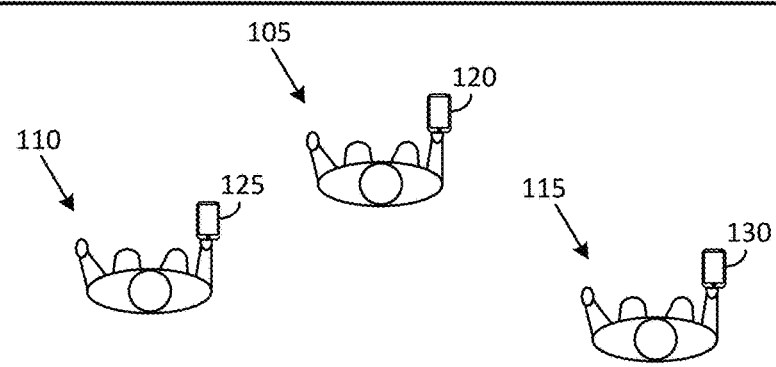

In terms of a general overview, certain embodiments described in this disclosure are directed to minimizing a time delay for a customer seeking a ride in a ride-hail vehicle at a crowded venue where multiple customers are attempting to obtain rides in ride-hail vehicles. In an example method, a ride-hail service provider responds to a ride request originated from a personal device of the customer by providing the customer, a ride-ID code or some other form of ride-confirmation data. The customer enters any ride-hail vehicle at the crowded venue without interacting with the driver of the ride-hail vehicle prior to getting into the ride-hail vehicle. The personal device of the customer then uses communications such as Bluetooth® or near-field communications (NFC) to execute a triangulation procedure (or trilateration) for determining whether the personal device is inside the ride-hail vehicle. Upon confirming that the personal device is inside the vehicle, the ride-ID code is automatically transmitted from the personal device of the customer to a personal device of the driver and further communications may then be carried out for authenticating the ride.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular component such as a first processor in a first computer may be performed by another component such as a second processor in another computer. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and terms are used herein solely for convenience and such words and terms should be interpreted as referring to various objects and actions that are generally understood in various forms and equivalencies by persons of ordinary skill in the art. More particularly, the phrase "personal device" as used herein can refer to any type of communication and/or computing device carried by a person. A few examples of a personal device include a smartphone, a tablet computer, a phablet (phone plus tablet), and a laptop computer. Word such as "rider," "customer," "person," "passenger," or "individual," may be used interchangeably in some cases. It should also be understood that the word "example" as used herein is intended to be non-exclusionary and non-limiting in nature.

FIG. 1 illustrates a first example scenario where several customers are seeking the services of ride-hail vehicles at a crowded venue. Some examples of a crowded venue include an airport terminal, an arena, a train terminal, a stadium, and a building that is hosting an event such as a conference or a trade show. At most such places, a number of people may exit a building simultaneously and form a crowd. Each person in the crowd may seek some form of transportation such as a private vehicle, a rental vehicle, a taxi, or a ride-hail vehicle.

The example scenario shown in FIG. 1 shows three of multiple individuals who are subscribers to a ride-hail service and are seeking to obtain a ride in a ride-hail vehicle. Of the three individuals, an individual 105 is using a personal device 120 to request a ride in a ride-hail vehicle. Another individual 110 is also using a personal device 125 to request a ride in a ride-hail vehicle, and yet another individual 115 is using a personal device 130 to request a ride in a ride-hail vehicle.

Several ride-hail vehicles such as a ride-hail vehicle 135, a ride-hail vehicle 140, a ride-hail vehicle 145, a ride-hail vehicle 150, and a ride-hail vehicle 155 are currently located in a driving area opposite the spot where the three individuals are standing. However, in conventional practice, none of the drivers in these vehicles may respond to a ride request initiated by any one of the three individuals, unless a communication is received from a server computer of the ride-hail service that has serviced the ride request.

Receiving such a communication from the ride-hail service can be a time-consuming affair, thereby frustrating both drivers and potential customers. After receiving the communication from the server computer, a driver may elect to either accept a ride request from one of the three individuals or may decide to turn down the ride request. This process also can be time-consuming, thereby frustrating a potential customer who is expecting the driver to respond to the request in a relatively quick manner.

Figure 2:
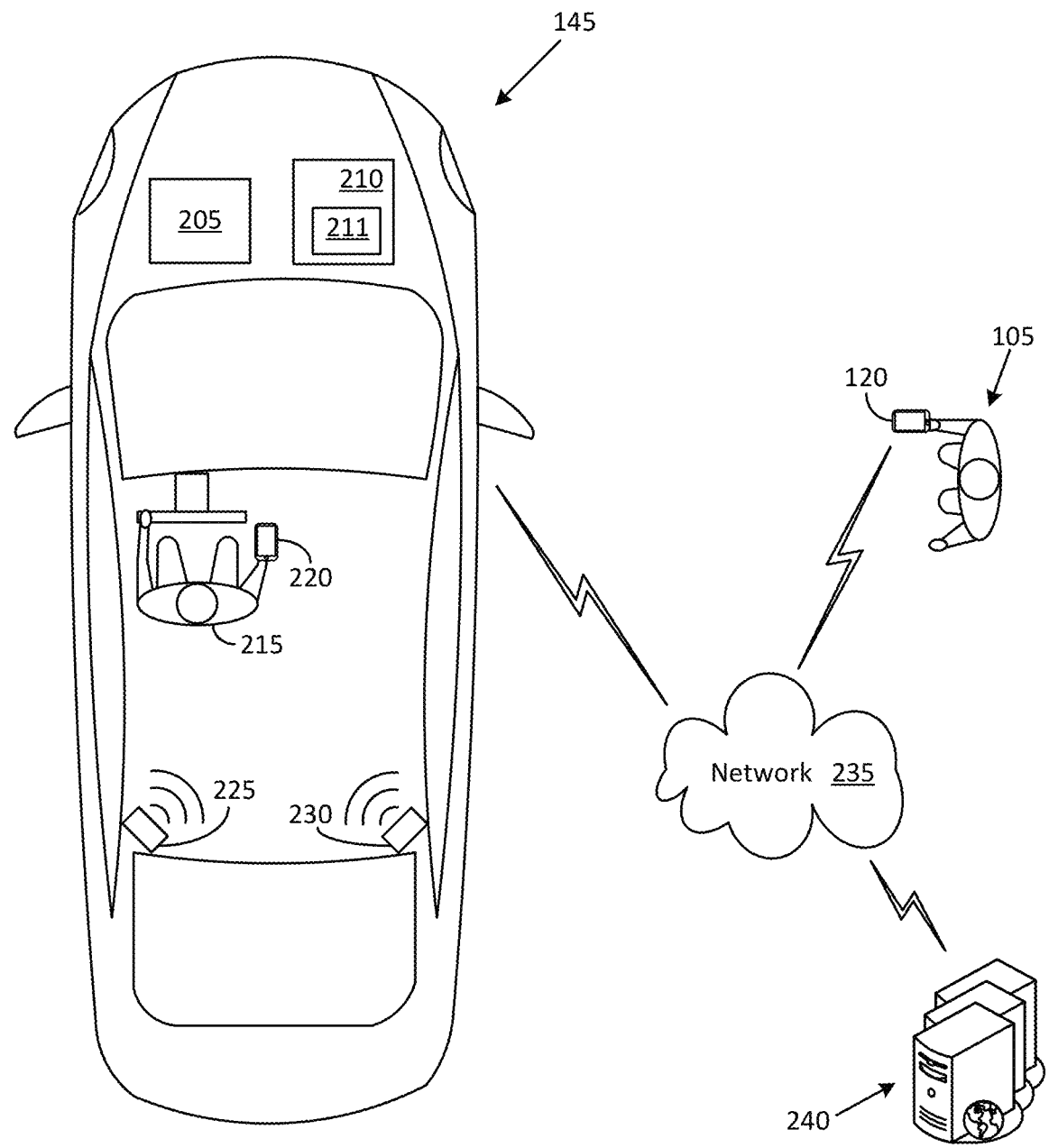
FIG. 2 illustrates some example components that may be provided in any of the various ride-hail vehicles shown in FIG. 1.

FIG. 2 illustrates some example components that may be provided in the ride-hail vehicle 145, which is one of the various ride-hail vehicles shown in FIG. 1. Also shown is the individual 105 who is seeking to obtain a ride in any ride-hail vehicle. The ride-hail vehicle 145 can be any of various types of vehicles employed by a ride-hail company such as, for example, Uber® of Lyft®. The various components provided in the ride-hail vehicle 145 can include a vehicle computer 205, an auxiliary computer 210, and a wireless communication system that includes several components such as, for example, a wireless communication node 225 and a wireless communication node 230 (other components of the wireless communication system are not shown).

The vehicle computer 205 may perform various functions such as controlling engine operations (fuel injection, speed control, emissions control, braking, etc.), managing climate controls (air conditioning, heating etc.), activating airbags, and issuing warnings (check engine light, bulb failure, low tire pressure, vehicle in blind spot, etc.). The auxiliary computer 210 can include elements such as, for example, a processor 211 that is configured to execute various operations in accordance with the disclosure. Some of these operations may be carried out independently by the auxiliary computer 210. Some other operations may be carried out by the auxiliary computer 210 in cooperation with one or more personal devices present inside the ride-hail vehicle 145, such as, for example, a personal device 220 carried by a driver 215 of the ride-hail vehicle 145. In one example implementation, the auxiliary computer 210 is an independent unit that is provided in the ride-hail vehicle 145 as a separate entity from the vehicle computer 205. In another example implementation, some or all parts of the auxiliary computer 210 can be incorporated into the vehicle computer 205.

In the example illustration shown in FIG. 1, the wireless communication node 225 and the wireless communication node 230 are located in two opposite corners of a rear portion of a cabin of the ride-hail vehicle 145. Other wireless communication nodes may be provided at other locations in the ride-hail vehicle 145. The wireless communication node 225 and the wireless communication node 230 are configured to use various forms of communication technologies to communicate with the auxiliary computer 210 and one or more personal devices that may be present inside the ride-hail vehicle 145.

In one example application, the wireless communication node 225 and the wireless communication node 230 communicate with the auxiliary computer 210, the personal device 220 of the driver 215, and/or any other personal device that may be present in the ride-hail vehicle 145, by using communication technologies that have limited signal coverage area. In some cases, the signal coverage area may be limited to an interior portion of the ride-hail vehicle 145, thereby precluding communications with devices located outside the ride-hail vehicle 145. For example, each of the wireless communication node 225 and the wireless communication node 230 can include a Bluetooth® Low Energy Module (BLEM) incorporating a low energy wireless transceiver and a compatible antenna.

In another example application, each of the wireless communication node 225 and the wireless communication node 230 can include an ultra-wideband (UWB) transceiver and communications between the wireless communication node 225, the wireless communication node 230, the auxiliary computer 210, the personal device 220, and/or any other personal device that may be present in the ride-hail vehicle 145 may be carried out using UWB communication formats.

In yet another example application, at least some components such as the auxiliary computer 210, the personal device 220, and/or any other personal device that may be present in the ride-hail vehicle 145, may communicate with each other using technologies such as near-field communication (NFC), ZigBee®, or radio-frequency identification (RFID).

The auxiliary computer 210 and some components of the wireless communication system in the ride-hail vehicle 145 may also be configured to communicate via a network 235 with devices located outside the ride-hail vehicle 145. For example, the auxiliary computer 210 and some components of the wireless communication system in the ride-hail vehicle 145 may communicate via the network 235 with a server computer 240. The server computer 240 may be operated by a ride-hail service provider and may be used to communicate with the auxiliary computer 210 and other devices such as the personal device 120 carried by the individual 105, for executing various ride-hail service-related functions.

The network 235 may include any one, or a combination of networks, such as a local area network (LAN), a wide area network (WAN), a telephone network, a cellular network, a cable network, a wireless network, and/or private/public networks such as the Internet. For example, the network 235 may support communication technologies such as cellular, Wi-Fi, and Wi-Fi direct.

The personal device 120 carried by the individual 105 can be a smartphone having a software application that is executed by the individual 105 for executing various ride-hail service-related functions. The personal device 120 is communicatively coupled via the network 235 to various components, such as, for example, the personal device 220 carried by the driver 215, the vehicle computer 205, the auxiliary computer 210, the wireless communication node 225, the wireless communication node 230, and the server computer 240.

In accordance with an example embodiment of the disclosure, the individual 105 launches the software application in the personal device 120 and requests a ride in a ride-hail vehicle. The request is transmitted from the personal device 120 to the server computer 240 via the network 235. The server computer 240 may execute various operations such as, for example, validate the credentials of the individual 235 as a subscriber of the ride-hail service, and may transmit to the personal device 120, a ride-ID code or some other form of ride-confirmation data. At this time, the ride-confirmation data does not include any reference to a specific ride-hail vehicle or to a specific ride-hail service driver.

Upon receiving the ride-ID code and/or ride-confirmation data, the individual 105 moves towards any one of the various ride-hail vehicles that are currently located in the driving area opposite the spot where the individual 105 is standing. In this example, the individual 105 selects the nearest ride-hail vehicle, which happens to be the ride-hail vehicle 145. At this time, the individual 105 has made no effort to contact the driver 215 in the ride-hail vehicle 145 nor waited to receive information about any assigned ride-hail vehicle or driver. Consequently, no time is wasted in such procedures. The individual 105 enters the ride-hail vehicle 145, and the personal device 120 automatically begins to execute certain operations in accordance with the disclosure that are described below in more detail.

Figure 3:
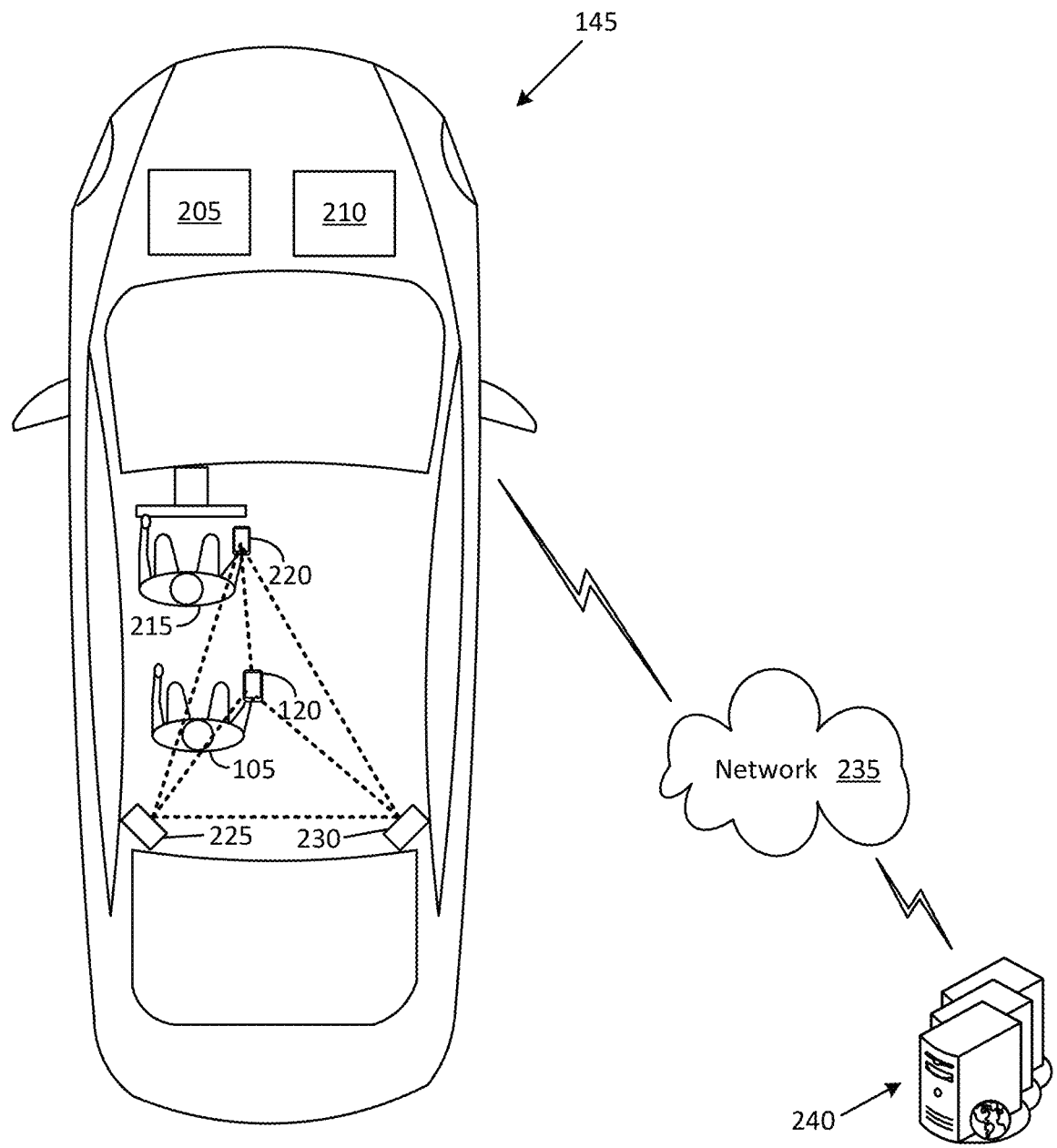
FIG. 3 illustrates an example rider-locating procedure that can be carried out in accordance with the disclosure to determine that the customer is seated inside a ride-hail vehicle.

FIG. 3 illustrates an example rider-locating procedure that can be carried out in accordance with the disclosure to determine that the individual 105, who is now a rider of the ride-hail vehicle 145, is seated inside the ride-hail vehicle 145. In one example implementation, the rider-locating procedure is automatically executed by the software application in the personal device 120 of the individual 105 after the personal device 120 detects entry of the individual 105 into the ride-hail vehicle 145. Detecting the entry of the individual 105 into the ride-hail vehicle 145 may be carried out in various ways. In one example case, the personal device 120 may use Bluetooth® to detect a proximity of the personal device 120 to the personal device 220 carried by the driver 215. The personal device 120 may then carry out a pairing operation to establish Bluetooth® communications with the personal device 220. A successful pairing operation can be indicative of the personal device 120 being located inside the ride-hail vehicle 145 and, by extension, of the individual 105 having entered the ride-hail vehicle 145.

In another example case, the personal device 120 may automatically execute a handshake procedure using UWB communications to establish UWB communications with the personal device 220 carried by the driver 215. Information pertaining to UWB communications in the ride-hail vehicle 145 may be provided to the personal device 120 by the server computer 240. A successful handshake between the personal device 120 and the personal device 220 can be indicative of the individual 105 having entered the ride-hail vehicle 145.

After entering the ride-hail vehicle 145, the individual 105 may decide to sit in any of various available seats. In some cases, the individual 105 may be the sole passenger of the ride-hail vehicle 145. In some other cases, the ride-hail vehicle 145 may be providing a pool service and other individuals may already be present inside the ride-hail vehicle 145. The location of the individual 105 inside the ride-hail vehicle 145 may then be determined by a triangulation procedure that can be initiated by the personal device 120 of the individual 105 or by the personal device 220 of the driver 215. The triangulation procedure, which may involve the wireless communication node 225, the wireless communication node 230, and either the personal device 220 or the personal device 120, can be carried out in various ways. For example, the triangulation procedure may be carried out in the form of a received signal strength indication (RSSI) procedure or a time-of-flight (ToF) procedure using various wireless technologies such as, for example, Bluetooth®, UWB, ZigBee®, NFC, and/or RFID.

In one example implementation of a triangulation procedure, the personal device 120 may obtain from the server computer 240, information about a separation distance between the wireless communication node 225 and the wireless communication node 230 in the ride-hail vehicle 145. The personal device 120 may then use UWB communications to execute the triangulation procedure. As is known, UWB radio technology involves the use of signals having very low energy levels for short-range, high-bandwidth communications over a large part of the radio spectrum. The technology enables pinpointing a precise location of objects such as smartphones, key fobs and tracking tags by measuring how long it takes super-short radio pulses to travel between devices equipped to operate using UWB.

In some cases, the wireless communication node 225 and the wireless communication node 230 may be configured to mimic an identifier(s) of the personal device 220 carried by the driver 215, such as, for example, a wireless signal ID, an International Mobile Equipment Identity (IMEI) number, a Mobile Equipment Identifier (MEID), a Media Access Control (MAC) address, a label used for Bluetooth® communications, or an Internet Protocol (IP) address. The wireless communication node 225 and the wireless communication node 230 receive and re-transmit the identifier(s) of the personal device 220 during the triangulation procedure. The personal device 120 may use the identifier(s) to identify the signals from the wireless communication node 225, the wireless communication node 230, and from the personal device 220 during the triangulation procedure to determine whether the personal device 120 is located inside the ride-hail vehicle 145.

In some cases, a time delay may be introduced into a signal transmitted by one or more of the devices such as the wireless communication node 225, the wireless communication node 230, the personal device 220, and/or or the personal device 120. The time delay may be based on various factors such as signal propagation time between two devices, signal processing delay in a device, a location of a device in the ride-hail vehicle 145, and/or an orientation of a device in the ride-hail vehicle 145.

Upon confirming that the personal device 120 is located inside the ride-hail vehicle 145, communications can be initiated between the personal device 120 and the personal device 220 of the driver 215 (and/or the auxiliary computer 210, in some cases). As a part of these communications, the personal device 120 transmits to the personal device 220, the ride-ID code (or other form of ride-confirmation data) received by the personal device 120 from the server computer 240 when the individual 105 was standing outside the ride-hail vehicle 145. The personal device 120 may also transmit to the personal device 220, information such as a name of the driver 215, a name of the individual 105, and a destination. At least some of this information may be received by the personal device 120 from the server computer 240 when the individual 105 was standing outside the ride-hail vehicle 145 or when the individual 105 is seated inside the ride-hail vehicle 145.

However, in at least some implementations, the personal device 120 may be configured to expressly inhibit sharing the ride-ID code (or other form of ride-confirmation data) with the personal device 220 of the driver 215 or with personal devices of other drivers of other ride-hail vehicles when the personal device 120 is located outside the ride-hail vehicle 145. Doing so, offers certain benefits such as security against hacking attacks, preventing unnecessary cellular communications, preventing driver turn-downs of rides, and time savings.

The personal device 220 of the driver 215 may further communicate with the server computer 240, either directly, or via the auxiliary computer 210, for additional purposes such as, for example, to send information to the server computer 240 that the driver 215 has accepted the ride, for tracking the ride-hail vehicle 145 during the trip, for metering, and/or for exchanging messages.

Figure 4:
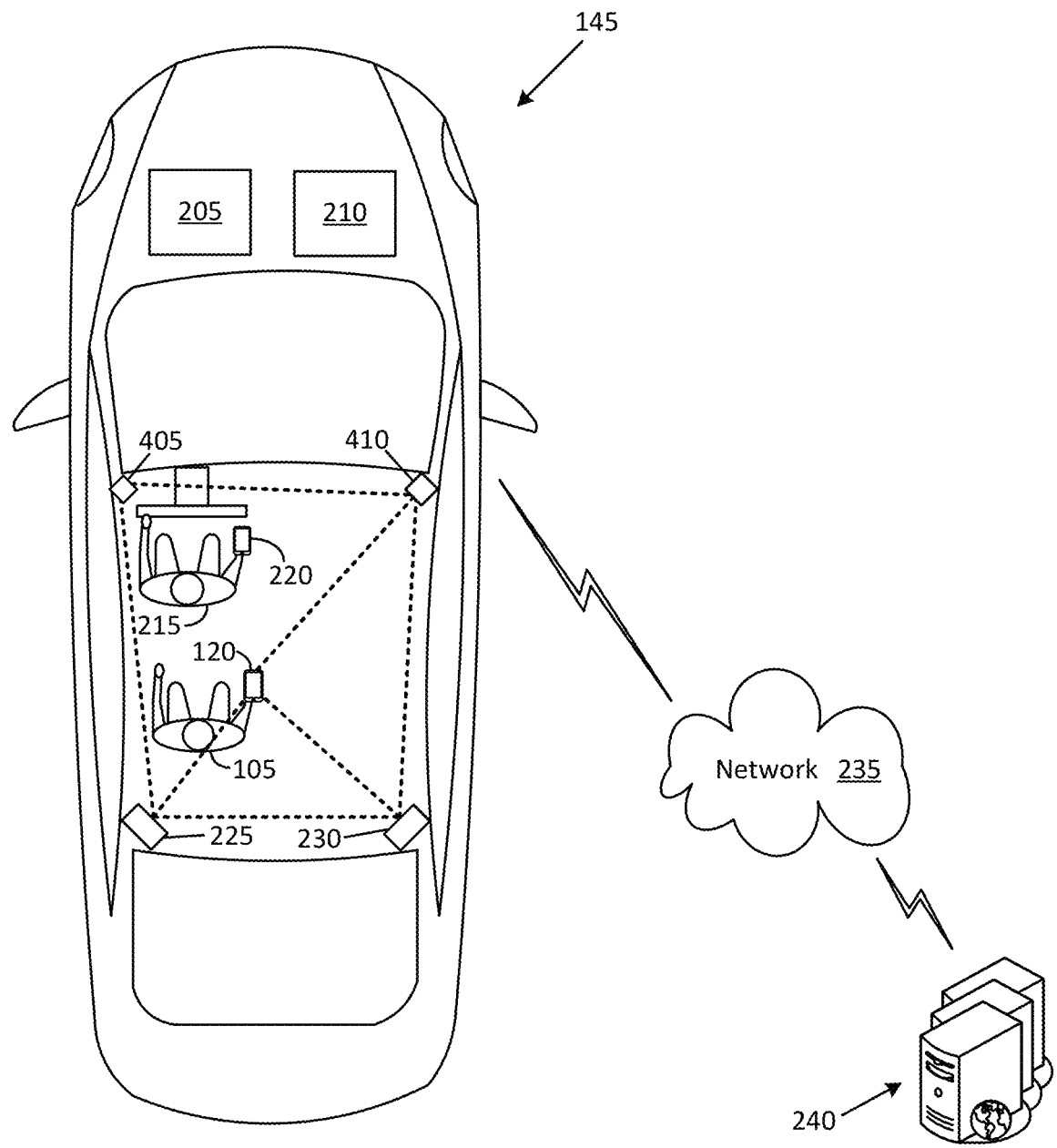
FIG. 4 illustrates another example rider-locating procedure that can be carried out in accordance with the disclosure to determine that the customer is seated inside a ride-hail vehicle.

FIG. 4 illustrates another example rider-locating procedure that can be carried out in accordance with the disclosure to determine that the individual 105 is seated inside the ride-hail vehicle 145. The rider-locating procedure described above involved operating the wireless communication node 225 and the wireless communication node 230 that are located at two opposite corners of a rear portion of a cabin of the ride-hail vehicle 145. In this rider-locating procedure, other wireless communication nodes may be used in lieu of, or in addition to, the wireless communication node 225 and the wireless communication node 230.

For example, a rider-locating procedure may include not only the wireless communication node 225 and the wireless communication node 230 but two additional wireless communication nodes located at two opposite corners of a front portion of the cabin of the ride-hail vehicle 145. The two additional wireless communication nodes (wireless communication node 405 and wireless communication node 410) may communicate with the wireless communication node 225, the wireless communication node 230, the personal device 120 and/or the personal device 220 to carry out a rider-locating procedure. The rider-locating procedure may be carried out using various wireless technologies such as, for example, Bluetooth®, UWB, ZigBee®, NFC, and/or RFID and may involve RSSI and/or time-of-flight (ToF) locating techniques.

Figure 5:
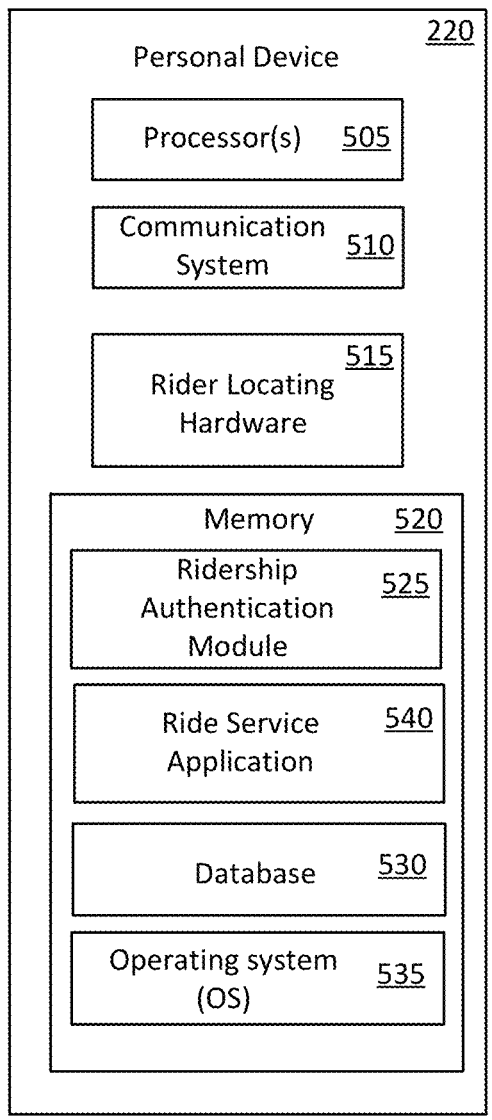
FIG. 5 illustrates some example components of a personal device that may be used by a driver of a ride-hail vehicle to execute various operations in accordance with the disclosure.

FIG. 5 illustrates some example components that may be included in the personal device 220 in accordance with an embodiment of the disclosure. The example components include a processor 505, a communication system 510, rider locating hardware 515, and a memory 520. The communication system 510 can include various components such as, for example, a Bluetooth® transceiver and a cellular communication system. The Bluetooth® transceiver can be used to communicatively couple the personal device 220 to various components such as, for example, the auxiliary computer 210 and the personal device 120 (when the individual 105 is seated inside the ride-hail vehicle 145). The cellular communication system can be used for cellular communications (voice, text, etc.) between the personal device 220, the server computer 240, and the personal device 120 (when the individual 105 is seated inside the ride-hail vehicle 145).

The rider locating hardware 515 is selected to allow the personal device 220 to execute rider-locating procedures for identifying a location of the individual 105 inside the ride-hail vehicle 145. Some components that may be incorporated into the rider locating hardware 515 include a Bluetooth® transceiver, a UWB transceiver, a ZigBee® transceiver, an NFC transceiver, and/or a RFID transceiver.

The memory 520, which is one example of a non-transitory computer-readable medium, may be used to store an operating system (OS) 535, a database 530, and various code modules such as a ridership authentication module 525 and a ride service application 540. The code modules are provided in the form of computer-executable instructions that can be executed by the processor 505 for performing various operations in accordance with the disclosure. For example, the ridership authentication module 525 can be executed by the processor 505 for performing various operations in accordance with the disclosure. Such operations may include a rider-locating procedure for identifying a location of the individual 105 inside the ride-hail vehicle 145 and authentication procedures for authenticating the individual 105 for completing a ride to a destination indicated by the individual 105.

In an exemplary implementation, the ridership authentication module 525 is a software application that is downloaded into the personal device 220 and activated by the driver 215 when the ride-hail vehicle 145 is available for providing ride services. The software application can be an independent application. or can be configured to work in cooperation with another software application such as, for example, a software application provided by a ride-hail company such as Uber® or Lyft®. Thus, for example, the ridership authentication module 525 may cooperate with a software application provided by a ride-hail company in order to obtain information about the individual 105 when the individual 105 is inside the ride-hail vehicle 145. The ridership authentication module 525 may also cooperate with a messaging application such as WhatsApp® to transmit text messages and images from the personal device 220 to the personal device 120 of the individual 105 under certain circumstances.

The ride service application 540 can be executed by the processor 505 for carrying out operations such as communicating with the server computer 240 to obtain information about demand for rides at various venues and for other operations associated with providing rides to customers.

The database 530 may be used to store various types of data that can be used by the ridership authentication module 525. For example, the database 530 may be used to store information about the individual 105, and preferences of the individual 105 (seating preference, music preference, payment-related information, etc.).

Figure 6:
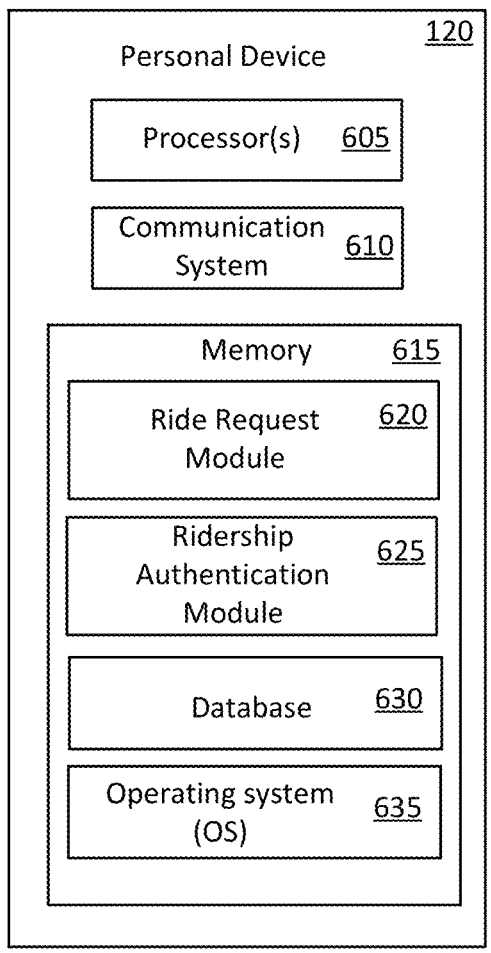
FIG. 6 illustrates some example components of a personal device that may be used by a customer of a ride-hail service to execute various operations in accordance with the disclosure.

FIG. 6 illustrates some example components that may be included in the personal device 120 in accordance with an embodiment of the disclosure. The example components include a processor 605, a communication system 610, and a memory 615. The communication system 610 can include various components such as, for example, a Bluetooth® transceiver and a cellular communication system. The Bluetooth® transceiver can be used to communicatively couple the personal device 120 to various components such as, for example, the personal device 220 (when the individual 105 is seated inside the ride-hail vehicle 145). The cellular communication system can be used for cellular communications (voice, text, etc.) between the personal device 120 and the server computer 240.

The memory 615, which is another example of a non-transitory computer-readable medium, may be used to store an operating system (OS) 635 and various code modules such as a ride request module 620 and a ridership authentication module 625. The code modules are provided in the form of computer-executable instructions that can be executed by the processor 605 for performing various operations in accordance with the disclosure. For example, the ride request module 620 can be executed by the processor 605 for performing various operations such as sending out a request for a ride in a ride-hail vehicle. In an exemplary implementation, the ride request module 620 is a software application that is downloaded into the personal device 120 and activated by the individual 105 when seeking a ride in a ride-hail vehicle. The software application can be a software application provided by a ride-hail company such as Uber® of Lyft®

The ridership authentication module 625 can be executed by the processor 605 for performing various operations in accordance with the disclosure. Such operations may include cooperating with the personal device 220 and/or one or more wireless communication nodes in the ride-hail vehicle 145 for executing a rider-locating procedure to identifying a location of the individual 105 inside the ride-hail vehicle 145. Other operations can include providing authenticating material to the driver 215 of the ride-hail vehicle 145, such as, for example, a ride-ID code or some other form of ride-confirmation data for a ride.

In an exemplary implementation, the ridership authentication module 625 is a software application that is downloaded into the personal device 120 and activated by the individual 105. The software application can be an independent application or can be configured to work in cooperation with another software application such as, for example, the ride request module 620. The ridership authentication module 625 may also cooperate with a messaging application such as WhatsApp® to transmit text messages and images from the personal device 120 to the personal device 220 of the driver 215 under certain circumstances.

The database 630 may be used to store various types of data that can be used by the ridership authentication module 625. For example, the database 630 may be used to store information about the individual 105, and preferences of the individual 105 (seating preference, music preference, payment-related information, etc.).

Figure 7:
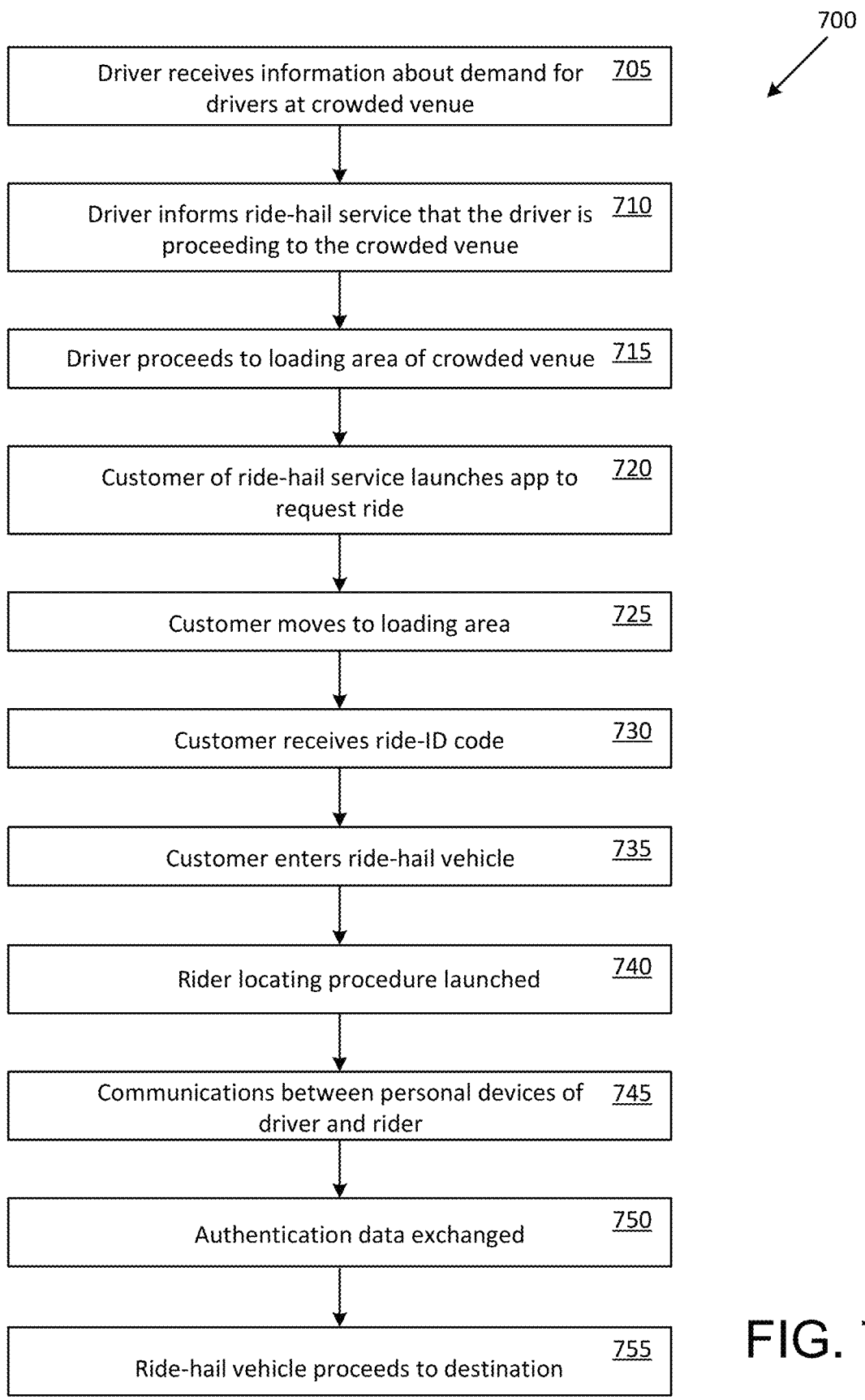
FIG. 7 is a flowchart of an example method to obtain a ride in any of various ride-hail vehicles at a crowded venue.

FIG. 7 is a flowchart 700 of an example method to obtain a ride in one of various ride-hail vehicles at a crowded venue such as illustrated in FIG. 1. The flowchart 700 illustrates a sequence of operations that can be implemented in hardware, software, or a combination thereof. In the context of software, the operations represent computer-executable instructions stored on one or more non-transitory computer-readable media such as the memory 520 and the memory 615, which, when executed by one or more processors such as the processor 505 and the processor 605 perform the recited operations. More particularly, some or all of the computer-executable instructions can be embodied in the form of the ridership authentication module 525, the ridership authentication module 525, and the ride request module 620 described herein.

Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. The various objects that are included in FIGS. 1 through 6 are used below for purposes of description. However, it must be understood that the description is equally applicable to other objects in various other embodiments.

At block 705, a driver of a ride-hail vehicle receives information pertaining to a demand for drivers at a crowded venue where multiple customers are attempting to obtain rides in ride-hail vehicles. For example, the driver 215 of the ride-hail vehicle 145 may receive such information from the server computer 240 of the ride-hail service.

At block 710, a personal device of the driver may provide an indication to the computer of the ride-hail service that the driver is responding to the demand by proceeding towards the crowded venue. For example, the ride service application 540 may send a notification to the server computer 240 about the driver 215 proceeding towards the crowded venue.

At block 715, the driver proceeds to a loading area at the crowded venue. For example, the driver 215 may proceed to a parking deck of an airport where multiple passengers are waiting for ride-hail vehicles.

At block 720, a customer of the ride-hail service at the crowded venue, launches a software application and requests a ride to a desired destination. For example, the individual 105 may use the personal device 120 from inside the airport after alighting from an airplane, to send out a ride request to the server computer 240, the ride request specifying a destination that the individual 105 wishes to travel to.

At block 725, the potential customer moves towards the loading area where the ride-hail vehicles would be available. For example, the individual 105 may move to the parking deck of the airport.

At block 730, the potential customer receives a ride-ID code (or other form of ride-confirmation data) from the computer of the ride-hail service. For example, the individual 105 may receive a ride-ID code from the server computer 240 in response to the request for the ride.

At block 735, the potential customer enters a ride-hail vehicle among the various ride-hail vehicles at the loading area. For example, the individual 105 enters the ride-hail vehicle 145 among the various ride-hail vehicles shown in FIG. 1.

At block 740, a rider-locating procedure may be launched by the personal device of the customer who has now entered the ride-hail vehicle. For example, the ridership authentication module 625 in the personal device 120 of the individual 105 may execute a triangulation procedure for determining whether the personal device 120 is inside the ride-hail vehicle 145.

At block 745, the personal device of the customer may communicate with the personal device of the driver to exchange authentication data. For example, the personal device 120 of the individual 105 may communicate with the personal device 220 of the driver 215.

At block 750, the personal device of the customer may provide authentication data to the personal device of the driver. For example, the personal device 120 of the individual 105 may provide the ride-ID code to the personal device 220 of the driver 215.

At block 755, the ride-hail vehicle proceeds to the destination after verifying the ride-ID code and obtaining additional information from the personal device of the customer and/or from the computer of the ride-hail service. For example, the ride-hail vehicle 145 proceeds to the destination after verifying the ride-ID code and obtaining additional information from the personal device 120 of the individual 105 and/or from the server computer 240.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and memory, as discussed herein. An implementation of the devices, systems, and methods disclosed herein may communicate over a computer network. A "network" and a "bus" is defined as one or more data links that enable the transport of electronic data between computer systems and/or modules and/or other electronic devices. When information is transferred or provided over a network, a bus, or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced using various devices including personal computers, desktop computers, laptop computers, message processors, handheld devices, multi-processor systems, microprocessor-based or programmable consumer electronics, mobile telephones, PDAs, tablets, pagers, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

A memory such as the memory 520 and the memory 615 described herein, can include any one memory element or a combination of volatile memory elements (e.g., random access memory (RAM, such as DRAM, SRAM, SDRAM, etc.)) and non-volatile memory elements (e.g., ROM, hard drive, tape, CD ROM, etc.). Moreover, the memory device may incorporate electronic, magnetic, optical, and/or other types of storage media. In the context of this document, a "non-transitory computer-readable medium" can be, for example, but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

In the context of software, the operations described herein with respect to processors, such as the processor 505 and the processor 605, may be implemented by computer-executable instructions stored on one or more non-transitory computer-readable media such as the memory 520 and the memory 615 respectively, that, when executed by one or more processors such as the processor 505 and the processor 605, perform the recited operations. Generally, computer-executable instructions include routines, programs, objects, components, data structures, and the like that perform particular functions or implement particular abstract data types.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   receiving, by a ride-hail service, a ride request from a first personal device;
   providing, by the ride-hail service, a ride-ID code to the first personal device;
   determining, by the first personal device and/or a second device located inside a ride-hail vehicle, that the first personal device is inside the ride-hail vehicle; and
   automatically transmitting, by the first personal device and based on the first personal device being located inside the ride-hail vehicle, the ride-ID code to the second device located inside the ride-hail vehicle.

2. The method of claim 1, wherein the first personal device is operated by a rider of the ride-hail vehicle and the second device is operated by a driver of the ride-hail vehicle.

3. The method of claim 2, wherein determining that the first personal device is inside the ride-hail vehicle comprises:
   executing a triangulation procedure for identifying a location of the first personal device inside the ride-hail vehicle, wherein the triangulation procedure is based on communications between the first personal device and three transceivers in the ride-hail vehicle.

4. The method of claim 3, wherein the second personal device comprises one of the three transceivers participating in the triangulation procedure.

5. The method of claim 2, wherein exchange of the ride-ID code between the first personal device of the rider and the second device of the driver is executed based on one of Bluetooth® communication, near-field communication (NFC), ultra-wideband (UWB) communication, or radio-frequency identification (RFID).

6. The method of claim 2, further comprising:
   inhibiting transmission of the ride-ID code by the first personal device of the rider to the second personal device of the driver when the first personal device is located outside the ride-hail vehicle.

7. The method of claim 2, further comprising:
   providing, by the first personal device of the rider, from the second personal device of the driver, a device identification (ID) of the second personal device; and
   receiving, by the second personal device of the driver and based on the device ID of the second personal device and subject to the first personal device being located inside the ride-hail vehicle, the ride-ID code, from the first personal device of the rider.

8. A method comprising:
   determining, by a first personal device, entry of the first personal device into a ride-hail vehicle;
   executing, by the first personal device, a triangulation procedure for identifying a location of the first personal device inside the ride-hail vehicle, the triangulation procedure based in part on communications between the first personal device and three transceivers in the ride-hail vehicle; and
   automatically exchanging, by the first personal device and based on identifying the location of the first personal device inside the ride-hail vehicle, ride-confirmation data with a second personal device located inside the ride-hail vehicle.

9. The method of claim 8, wherein the first personal device is operated by a rider of the ride-hail vehicle and the second personal device is operated by the ride-hail vehicle.

10. The method of claim 9, wherein the three transceivers include a first transceiver in a first wireless communication node located in the ride-hail vehicle, a second transceiver in a second wireless communication node located in the ride-hail vehicle, and a third transceiver located in the second personal device of a driver of the ride-hail vehicle.

11. The method of claim 10, wherein each of the first transceiver and the second transceiver are configured to mimic one or more identifiers of the second personal device, the one or more identifiers comprising one of an International Mobile Equipment Identity (IMEI) number, a Mobile Equipment Identifier (MEID), a Media Access Control (MAC) address, a label used for Bluetooth® communications, or an Internet Protocol (IP) address.

12. The method of claim 10, wherein the ride-confirmation data comprises at least one of a ride-ID code, a name of the driver, a name of the rider, and a destination.

13. The method of claim 10, wherein exchanging of the ride-confirmation data between the first personal device of the rider and the second personal device of the driver is executed based on one of Bluetooth® communication, ultra-wideband (UWB) communication, near-field communication (NFC), or radio-frequency identification (RFID).

14. The method of claim 9, further comprising:
    inhibiting exchanging of the ride-confirmation data between the first personal device of the rider and the second personal device of a driver when the first personal device is located outside the ride-hail vehicle.

15. The method of claim 9, further comprising:
    obtaining, by the first personal device of the rider, from the second personal device of a driver, a device identification (ID) of the second personal device; and
    exchanging the ride-confirmation data exclusively between the first personal device of the rider and the second personal device of the driver based on the device ID of the second personal device and subject to the first personal device being located inside the ride-hail vehicle.

16. A system comprising:
a first personal device comprising:
a memory that stores computer-executable instructions; and
- a processor configured to access the memory and execute the computer-executable instructions to at least:
  - determine entry of the first personal device into a ride-hail vehicle;
  - execute a triangulation procedure for identifying a location of the first personal device inside the ride-hail vehicle, the triangulation procedure based in part on communications between the processor and three transceivers in the ride-hail vehicle; and
  - automatically exchange, based on identifying the location of the first personal device inside the ride-hail vehicle, ride-confirmation data with a second processor in a second personal device located inside the ride-hail vehicle.

17. The system of claim 16, wherein the first personal device is operated by a rider of the ride-hail vehicle and the second personal device is operated by a driver of the ride-hail vehicle.

18. The system of claim 17, wherein the three transceivers include a first transceiver in a first wireless communication node located in the ride-hail vehicle, a second transceiver in a second wireless communication node located in the ride-hail vehicle, and a third transceiver located in the second personal device of the driver of the ride-hail vehicle.

19. The system of claim 18, wherein each of the first transceiver and the second transceiver are configured to mimic one or more identifiers of the second personal device, the one or more identifiers comprising at least one of an International Mobile Equipment Identity (IMEI) number, a Mobile Equipment Identifier (MEID), a Media Access Control (MAC) address, a label used for Bluetooth® communications, or an Internet Protocol (IP) address.

20. The system of claim 18, wherein the ride-confirmation data comprises a ride-ID code, a name of the driver, a name of the rider, and a destination.

\* \* \* \* \*